(12) United States Patent
Kim et al.

(10) Patent No.: US 10,090,560 B2
(45) Date of Patent: Oct. 2, 2018

(54) NON-AQUEOUS LIQUID ELECTROLYTE AND LITHIUM SECONDARY BATTERY COMPRISING THE SAME

(71) Applicant: LG Chem, Ltd., Seoul (KR)

(72) Inventors: Shul Kee Kim, Daejeon (KR); Chul Haeng Lee, Daejeon (KR); Young Min Lim, Daejeon (KR); Gwang Yeon Kim, Daejeon (KR)

(73) Assignee: LG Chem, Ltd. (KR)

( * ) Notice: Subject to any disclaimer, the term of this patent is extended or adjusted under 35 U.S.C. 154(b) by 37 days.

(21) Appl. No.: 15/108,981

(22) PCT Filed: Sep. 25, 2015

(86) PCT No.: PCT/KR2015/010239
§ 371 (c)(1),
(2) Date: Jun. 29, 2016

(87) PCT Pub. No.: WO2016/048104
PCT Pub. Date: Mar. 31, 2016

(65) Prior Publication Data
US 2016/0329601 A1 Nov. 10, 2016

(30) Foreign Application Priority Data

Sep. 26, 2014 (KR) ................ 10-2014-0128880
Sep. 24, 2015 (KR) ................ 10-2015-0135260

(51) Int. Cl.
| | | |
|---|---|---|
| *H01M 10/056* | (2010.01) | |
| *H01M 10/0525* | (2010.01) | |
| *H01M 10/0567* | (2010.01) | |
| *H01M 4/525* | (2010.01) | |
| *H01M 10/052* | (2010.01) | |
| *H01M 10/0568* | (2010.01) | |
| *H01M 4/136* | (2010.01) | |
| *H01M 4/50* | (2010.01) | |
| *H01M 4/505* | (2010.01) | |
| *H01M 4/52* | (2010.01) | |
| *H01M 10/0569* | (2010.01) | |
| *H01M 4/02* | (2006.01) | |

(52) U.S. Cl.
CPC ....... *H01M 10/0567* (2013.01); *H01M 4/136* (2013.01); *H01M 4/502* (2013.01); *H01M 4/505* (2013.01); *H01M 4/523* (2013.01); *H01M 4/525* (2013.01); *H01M 10/052* (2013.01); *H01M 10/0525* (2013.01); *H01M 10/0568* (2013.01); *H01M 10/0569* (2013.01); *H01M 2004/028* (2013.01); *H01M 2220/30* (2013.01); *H01M 2300/0034* (2013.01)

(58) Field of Classification Search
None
See application file for complete search history.

(56) References Cited

U.S. PATENT DOCUMENTS

| | | |
|---|---|---|
| 2004/0053138 A1 | 3/2004 | Otterstedt et al. |
| 2012/0164519 A1 | 6/2012 | Lee et al. |
| 2012/0258357 A1 | 10/2012 | Kim |
| 2013/0337338 A1 | 12/2013 | Tikhonov et al. |
| 2013/0337339 A1 | 12/2013 | Tikhonov et al. |
| 2014/0141313 A1 | 5/2014 | Takase et al. |
| 2014/0186722 A1 | 7/2014 | Lim et al. |
| 2014/0272605 A1 | 9/2014 | Lim et al. |
| 2015/0037668 A1 | 2/2015 | Iwaya et al. |
| 2015/0140443 A1* | 5/2015 | Takahashi ............ H01M 4/505 429/330 |
| 2015/0303521 A1 | 10/2015 | Sasaki et al. |

FOREIGN PATENT DOCUMENTS

| | | | |
|---|---|---|---|
| JP | WO 2013183655 A1 * | 12/2013 | ............ H01M 4/505 |
| KR | 20040024842 A | 3/2004 | |
| KR | 20120090755 A | 8/2012 | |
| KR | 20140066082 A | 5/2014 | |
| KR | 20140082573 A | 7/2014 | |
| KR | 20140104384 A | 8/2014 | |
| WO | 2013183719 A1 | 12/2013 | |
| WO | 2014080871 A1 | 5/2014 | |

OTHER PUBLICATIONS

International Search Report for Application No. PCT/KR2015/010239 dated Dec. 28, 2015.

* cited by examiner

*Primary Examiner* — Tracy M Dove
(74) *Attorney, Agent, or Firm* — Lerner, David, Littenberg, Krumholz & Mentlik, LLP

(57) ABSTRACT

The present invention relates to a lithium secondary battery comprising a non-aqueous liquid electrolyte comprising lithium bis(fluorosulfonyl)imide (LiFSI) and a fluorinated ether compound as additives, a positive electrode comprising a lithium-nickel-manganese-cobalt-based oxide as a positive electrode active material, a negative electrode and a separator. According to a non-aqueous liquid electrolyte for a lithium secondary battery of the present invention, a rigid SEI layer may be formed at a negative electrode during the initial charging of the lithium secondary battery comprising the same, the output properties of the lithium secondary battery may be improved, and the output properties after storing at high temperature and capacity properties may be increased.

12 Claims, No Drawings

NON-AQUEOUS LIQUID ELECTROLYTE AND LITHIUM SECONDARY BATTERY COMPRISING THE SAME

CROSS-REFERENCE TO RELATED APPLICATION

This application is a national phase entry under 35 U.S.C. § 371 of International Application No. PCT/KR2015/010239, filed Sep. 25, 2015 which claims priority from Korean Patent Application No. 10-2014-0128880, filed Sep. 26, 2014 and Korean Patent Application No. 10-2015-0135260, filed Sep. 24, 2015, the disclosures of which are incorporated herein by reference.

TECHNICAL FIELD

The present invention relates to a lithium secondary battery comprising a non-aqueous liquid electrolyte comprising lithium bis(fluorosulfonyl)imide (LiFSI) and a fluorinated ether compound as additives, a positive electrode containing a lithium-nickel-manganese-cobalt-based oxide as a positive electrode active material, a negative electrode and a separator.

BACKGROUND ART

According to the increase of technical development and demand on mobile devices, the demand on secondary batteries as an energy source has been rapidly increased. Among the secondary batteries, lithium secondary batteries having high energy density and voltage are commercially available and widely used.

As a positive electrode active material of a lithium secondary battery, a lithium metal oxide is used, and as a negative electrode active material, a lithium metal, a lithium alloy, crystalline or amorphous carbon or a carbon composite is used. The active material is coated on a current collector to an appropriate thickness and length, or the active material itself is coated as a film shape and then is wrapped or stacked with a separator that is an insulating material, to form an electrode group. After that, the electrode group is inserted in a can or a vessel similar thereto, and an electrolyte is injected therein to manufacture a secondary battery.

In the lithium secondary battery, lithium ions repeat intercalation and deintercalation from a lithium metal oxide of a positive electrode to a carbon electrode to conduct charging and discharging. In this case, lithium is strongly reactive and reacts with the carbon electrode to produce $Li_2CO_3$, LiO, LiOH, etc. to form a coated layer on the surface of a negative electrode. This coated layer called a solid electrolyte interface (SET). The SEI layer formed at the beginning of charging may prevent the reaction of the lithium ions with the carbon negative electrode or other materials during charging and discharging. In addition, the SEI layer performs the role of an ion tunnel and passes only the lithium ions. The ion tunnel may induce the solvation of the lithium ions, and organic solvents of an electrolyte having high molecular weight may induce co-intercalation at the carbon negative electrode, thereby preventing the breaking of the structure of the carbon negative electrode.

Therefore, to improve the cycle properties at a high temperature and the output at a low temperature of a lithium secondary battery, a rigid SEI layer is necessary to be formed at the negative electrode of the lithium secondary battery. Once the SEI layer is formed during an initial charging, the SEI layer prevents the reaction of the lithium ions with the negative electrode or other materials during repeating charging and discharging while using the battery later and plays the role of the ion tunnel for passing only the lithium ions between an electrolyte and the negative electrode.

The improvement of the output properties at a low temperature is not expected for a common electrolyte not comprising an electrolyte additive or an electrolyte comprising an electrolyte additive with inferior properties due to the formation of a non-uniform SEI layer. In addition, even when an electrolyte additive is included, in the case when the amount required thereof is not controlled, the surface of the positive electrode may be decomposed during performing a reaction at a high temperature due to the electrolyte additive, or an oxidation reaction of the electrolyte may be carried out, thereby increasing the irreversible capacity and deteriorating the output properties of a secondary battery.

DISCLOSURE OF THE INVENTION

Technical Problem

An aspect of the present invention provides a non-aqueous liquid electrolyte for a lithium secondary battery, that may improve storage properties at a high temperature and lifespan properties and a lithium secondary battery comprising the same.

Technical Solution

According to an aspect of the present invention, there is provided a lithium secondary battery comprising a non-aqueous electrolyte comprising lithium bis(fluorosulfonyl)imide (LiFSI) and a fluorinated ether compound as additives, a positive electrode comprising lithium-nickel-manganese-cobalt-based oxide as a positive electrode active material, a negative electrode and a separator.

The non-aqueous liquid electrolyte may further comprise a lithium salt, and a mixing ratio of the lithium salt and the lithium bis(fluorosulfonyl)imide by molar ratio may be from 1:0.01 to 1:1. The concentration of the lithium bis(fluorosulfonyl)imide in the non-aqueous liquid electrolyte may be from 0.01 mol/L to 2 mol/L.

The lithium-nickel-manganese-cobalt-based oxide may be represented by the following Formula 1.

$$Li_{1+x}(Ni_aCo_bMn_c)O_2 \qquad \text{[Formula 1]}$$

In the above Formula, the conditions of $0.55 \le a \le 0.65$, $0.18 \le b \le 0.22$, $0.18 \le c \le 0.22$, $-0.2 \le x \le 0.2$ and $x+a+b+c=1$ may be satisfied.

Advantageous Effects

According to the non-aqueous liquid electrolyte for a lithium secondary battery and the lithium secondary battery comprising the same, a rigid SET layer may be formed at a negative electrode during performing the initial charging of the lithium secondary battery comprising the same, the thickness increase of a battery may be minimized by restraining the generation of a gas in high temperature environment, and preventing the decomposition of the surface of a positive electrode and the oxidation reaction of an electrolyte, thereby improving the storing properties at a high temperature and the lifespan properties of the lithium secondary battery.

BEST MODE FOR CARRYING OUT THE INVENTION

Hereinafter, the present invention will be described in more detail to assist the understanding of the present invention. It will be understood that terms or words used in the specification and claims, should not be interpreted as having a meaning that is defined in dictionaries, but should be interpreted as having a meaning that is consistent with their meaning in the context of the present invention on the basis of the principle that the concept of the terms may be appropriately defined by the inventors for the best explanation of the invention.

The non-aqueous liquid electrolyte according to an embodiment of the present invention comprises lithium bis(fluorosulfonyl)imide (LiFSI).

The lithium bis(fluorosulfonyl)imide is added in the non-aqueous liquid electrolyte as a lithium salt to form a rigid and thin SEI layer on a negative electrode and to improve output properties at a low temperature. Further, the decomposition of the surface of a positive electrode, which may be possibly generated during performing cycle operation at a high temperature, may be restrained, and the oxidation reaction of the electrolyte may be prevented. In addition, since the SEI coated layer formed on the negative electrode has a thin thickness, the movement of lithium ions at the negative electrode may be performed smoothly, and the output of a secondary battery may be improved.

According to an embodiment of the present invention, the concentration of the lithium bis(fluorosulfonyl)imide in the non-aqueous liquid electrolyte is preferably from 0.01 mol/L to 2 mol/L and more preferably, from 0.01 mol/L to 1 mol/L. In the case that the concentration of the lithium bis(fluorosulfonyl)imide is less than 0.1 mol/L, the improving effects of the output at a low temperature and the cycle properties at a high temperature may be insignificant, and in the case that the concentration of the lithium bis(fluorosulfonyl)imide exceeds 2 mol/L, side reactions in the electrolyte during the charging and discharging of the battery may occur excessively, swelling phenomenon may be generated, and the corrosion of a positive electrode or a negative electrode collector formed by using a metal in the electrolyte may be induced.

To prevent the above-described side reaction, a lithium salt may be further included in the non-aqueous liquid electrolyte of the present invention. The lithium salt may comprise commonly used lithium salts in this field. For example, one or a mixture of at least two selected from the group consisting of $LiPF_6$, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$, $LiSO_3CF_3$ and $LiClO_4$ may be used.

The mixing ratio of the lithium salt and the lithium bis(fluorosulfonyl)imide is preferably from 1:0.01 to 1 by the molar ratio. In the case that the mixing ratio of the lithium salt and the lithium bis(fluorosulfonyl)imide is greater than the upper limit, the side reaction in the electrolyte during the charging and discharging of the battery may be excessively carried out, and swelling phenomenon may be generated. In the case that the molar ratio is less than the lower limit, the improvement of the output properties produced of the secondary battery may be deteriorated. Particularly, in the case that the mixing ratio of the lithium salt and the lithium bis(fluorosulfonyl)imide by the molar ratio is less than 1:0.01, irreversible reaction may be carried out a lot during the forming process of an SEI coated layer in a lithium ion battery and the intercalation process of solvated lithium ions by a carbonate-based solvent between negative electrodes, and the improving effects of the output at a low temperature and the cycle properties and capacity properties after storing at a high temperature of the secondary battery may become insignificant due to the exfoliation of the surface layer of the negative electrode (for example, the surface layer of carbon) and the decomposition of an electrolyte. When the mixing ratio of the lithium salt and the lithium bis(fluorosulfonyl)imide by the molar ratio exceeds 1:1, excessive amount of lithium bis(fluorosulfonyl)imide may be included in an electrolyte, and an electrode collector may be corroded during performing charging and discharging and the stability of the secondary battery may be deteriorated.

The positive electrode active material of the lithium-nickel-manganese-cobalt-based oxide may comprise an oxide represented by the following Formula 1.

[Formula 1]

In the above Formula, the conditions of $0.55 \le a \le 0.65$ $0.18 \le b \le 0.22$, $0.18 \le c \le 0.22$, $-0.2 \le x \le 0.2$ and $x+a+b+c=1$ are satisfied.

By using the positive electrode active material of the lithium-nickel-manganese-cobalt-based oxide in the positive electrode, synergistic effect may be attained through the combination with the lithium bis(fluorosulfonyl)imide. When the amount of Ni in the positive electrode active material of the lithium-nickel-manganese-cobalt-based oxide increases, cation mixing by which the site of $Li^{+1}$ ions and the site of $Ni^{+2}$ ions are exchanged in the lamella structure of the positive electrode active material during charging and discharging may be generated, and the structure thereof may be broken. Thus, the side reaction of the positive electrode active material with the electrolyte may be performed, or the elution phenomenon of a transition metal may be exhibited. The cation mixing is carried out because the size of the $Li^{+1}$ ion and the size of the $Ni^{+2}$ ion are similar. Through the side reaction, the electrolyte in the secondary battery may be depleted, and the structure of the positive electrode active material may be broken, thereby easily deteriorating the performance of the battery.

Therefore, an electrolyte in which the lithium bis(fluorosulfonyl)imide is applied is used in the positive electrode active material of Formula 1 according to an embodiment of the present invention to form a layer at the surface of the positive electrode using a lithium bis(fluorosulfonyl)imide induced component so as to restrain the cation mixing phenomenon of the Li ions and the $Ni_{+2}$ ions while obtaining the range for securing the amount of a nickel transition metal sufficient for securing the capacity of the positive electrode active material. According to the positive electrode active material comprising the oxide according to the above Formula 1 of the present invention, side reaction with the electrolyte and metal eluting phenomenon may be effectively restrained by using the electrolyte in which the lithium bis(fluorosulfonyl)imide is applied.

In particular, in the case that the ratio of the Ni transition metal in the oxide represented by the above Formula 1 exceeds 0.65, an excessive amount of Ni is included in the positive electrode active material, and the cation mixing phenomenon of the $L^{+1}$ ions and the $Ni^{+2}$ ions may not be restrained even by the layer formed using the lithium bis(fluorosulfonyl)imide at the surface of the electrode.

In addition, in the case that an excessive amount of the Ni transition metal is included in the positive electrode active material, the oxidation number of Ni may be changed. When the nickel transition metal having a d orbital makes a coordination bond, a regular octahedron structure may be formed, however in an environment comprising a high temperature, etc., the order of the energy level of the nickel transition metal may be changed or the oxidation number thereof may be changed (disproportionation reaction) by the application of external energy to form a twisted octahedron structure. Thus, the crystal structure of the positive electrode active material comprising the nickel transition metal may be deformed, and the probability of the elution of the nickel metal in the positive electrode active material may be increased.

As a result, the inventors of the present invention confirmed that the high output, the stability at a high temperature and the good efficiency of capacity properties may be secured through the combination of the positive electrode active material comprising the oxide according to the above Formula 1 with a lithium bis(fluorosulfonyl)imide salt.

In addition, a fluorinated ether compound may be included as an electrolyte additive according to an embodiment of the present invention. Particularly, at least one selected from the group consisting of the compounds represented by the following Formula 2 may be illustrated.

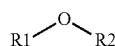

[Formula 2]

In the above Formula 2, $R_1$ and $R_2$ are independently a linear or branched alkyl group having 2 to 6 carbon atoms and at least 5 fluorine atoms. Particularly, the fluorinated ether compound may be at least one selected from the group consisting of di(1,1,1,2,2,3,3,4,4-nonafluoropentyl)ether and di(1,1,1,2,2,3,3,4,4,5,5-undecafluoropentyl)ether.

In a lithium secondary battery, oxygen released from a positive electrode in high temperature environment may promote the exothermic decomposition reaction of an electrolyte solvent and induce the expansion of a battery, so called, swelling phenomenon, to rapidly deteriorate the lifespan and the efficiency of charging and discharging of the battery. In some cases, the battery may be exploded and the stability thereof may be largely deteriorated. Since a fluorine substituent in the fluorinated ether compound added in the electrolyte is a flame retardant component, the generation of a gas due to the decomposition of the electrolyte at a high temperature through the reaction of the electrolyte with the surface of the negative electrode and the positive electrode in the battery may be restrained. In addition, the resistance in a voltage range of the secondary battery may be decreased by using an ether compound that has low viscosity and may increase ionic conductivity. Thus, the lifespan properties of the secondary battery may be improved.

In this case, the amount of the fluorinated ether compound may not be limited only if sufficient to accomplish the effects of the present invention comprising the improvement of the storing properties at a high temperature and the lifespan properties of the battery. For example, the amount of the fluorinated ether compound may be from 1 to 20 wt % and preferably may be from 3.0 to 15 wt % based on the total amount of the electrolyte. In the case that the amount of the fluorinated ether compound is less than 1 wt %, the restraining effect of gas generation, flame retardant properties and the decreasing effect of resistance may be insufficiently obtained. In the case that the amount of the fluorinated ether compound exceeds 20 wt %, the increasing degree of the effects may be limited, however irreversible capacity may be increased or the resistance of the negative electrode may be increased. Particularly, the amount of the fluorinated ether compound may be controlled by the amount added of the lithium bis(fluorosulfonyl)imide so as to efficiently prevent the generation of side reaction possibly carried out according to the addition of a large amount of the lithium bis(fluorosulfonyl)imide.

In addition, a non-aqueous organic solvent that may be included in the non-aqueous liquid electrolyte is not limited only if the decomposition thereof due to oxidation reaction, etc. during the charging and discharging of a battery may be minimized and target properties may be exhibited with the additive. For example, a nitrile-based solvent, a cyclic carbonate solvent, a linear carbonate solvent, an ester solvent, an ether solvent or a ketone solvent, etc. may be used. These solvents may be used alone or as a combination of two or more.

In the organic solvents, a carbonate-based organic solvent may be readily used. The cyclic carbonate solvent may be one selected from the group consisting of ethylene carbonate (EC), propylene carbonate (PC) and butylene carbonate (BC), or a mixture of at least two thereof. The linear carbonate solvent may be one selected from the group consisting of dimethyl carbonate (DMC), diethyl carbonate (DEC), dipropyl carbonate (DPC), ethyl methyl carbonate (EMC), methyl propyl carbonate (MPC) and ethyl propyl carbonate (EPC), or a mixture of at least two thereof.

The nitrile-based solvent may be at least one selected from the group consisting of acetonitrile, propionitrile, butyronitrile, valeronitrile, caprylonitrile, heptanenitrile, cyclopentane carbonitrile, cyclohexane carbonitrile, fluorobenzonitrile, 4-fluorobenzonitrile, difluorobenzonitrile, trifluorobenzonitrile, phenylacetoriitrile, 2-fluorophenyl acetonitrile and 4-fluorophenyl acetonitrile. The non-aqueous solvent according to an embodiment of the present invention may be the acetonitrile.

Meanwhile, the lithium secondary battery according to an embodiment of the present invention may comprise a positive electrode, a negative electrode, a separator disposed between the positive electrode and the negative electrode and the non-aqueous liquid electrolyte. The positive electrode and the negative electrode may comprise the positive electrode active material and the negative electrode active material, respectively, according to an embodiment of the present invention.

Meanwhile, the negative electrode active material may comprise amorphous carbon and crystalloid carbon and may use carbon such as non-graphitized carbon, graphitized carbon, etc; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Ph and Ge; Me': Al, B, P, Si, elements in group 1, group 2 and group 3 on the periodic table, and halogen; $0 < x \leq 1$; $1 \leq y \leq 3$; $1 \leq z \leq 8$), etc.; a lithium metal; a lithium alloy; a silicon-based alloy; a tin-based alloy; an oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene; and a Li—Co—Ni-based material.

In addition, the separator may be a porous polymer film, for example, a porous polymer film manufactured by using a polyolefin-based polymer such as an ethylene homopolymer, a propylene homopolymer, an ethylene/butane copolymer, an ethylene/hexene copolymer and an ethylene/methacrylate copolymer alone, or a stacked film of at least two thereof. Besides, a commonly used porous non-woven fabric, for example, a non-woven fabric formed by using a glass fiber having a high melting point, a polyethyleneterephthalate fiber, etc. may be used, without limitation.

The secondary battery may have various types such as a cylindrical type, a prismatic type, a pouch type, etc. according to executing purpose, and the present invention is not limited to the configuration known in this art. The lithium secondary battery according to an embodiment of the present invention may be the pouch type secondary battery.

Mode for Carrying out the Invention

Hereinafter, the present invention will be explained in more detail referring to examples and experimental examples, however the present invention is not limited to the following examples and experimental examples.

EXAMPLES

Example 1

[Preparation of Electrolyte]
A non-aqueous liquid electrolyte was prepared by adding a non-aqueous organic solvent having a component ratio of ethylene carbonate (EC):ethyl methyl carbonate (EMC)=3:7 (by volume), 0.9 mol/L of $LiPF_6$ and 0.1 mol/L of lithium bis(fluorosulfonyl)imide as lithium salts based on the total amount of the non-aqueous liquid electrolyte, and 5 wt % of di(1,1,1,2,2,3,3,4,4-nonafluoropentyl)ether as an additive based on the total amount of the non-aqueous liquid electrolyte.

[Manufacture of Lithium Secondary Battery]
92 wt % of Li $(Ni_{0.6}Co_{0.2}Mn_{0.2})O_2$ as a positive electrode active material, 4 wt % of carbon black as a conductive material, and 4 wt % of polyvinylidene fluoride (PVdF) as a binder were added in an N-methyl-2-pyrrolidone (NMP) solvent to produce a positive electrode mixture slurry. The positive electrode mixture slurry was coated on a positive electrode collector, an aluminum (Al) thin film having a thickness of 20 μm, dried and roll pressed to form a positive electrode.

In addition, a carbon powder as a negative electrode active material, PVdF as a binder, carbon black as a conductive agent were used in an amount ratios of 96 wt %, 3 wt % and 1 wt %, respectively, and were added in an NMP solvent to prepare a negative electrode mixture slurry. The negative electrode mixture slurry was coated on a negative electrode collector, a copper (Cu) thin film having a thickness of 10 μm, dried and roll pressed to form a negative electrode.

A polymer type battery was manufactured using the positive electrode and the negative electrode thus manufactured together with a separator with three layers of polypropylene/polyethylene/polypropylene (PP/PE/PP), and the non-aqueous liquid electrolyte prepared above was injected therein to complete a lithium secondary battery.

Example 2

A non-aqueous liquid electrolyte and a lithium secondary battery were obtained by performing the same procedure described in Example I except for using 0.7 mol/L of $LiPF_6$ and 0.3 mol/L of lithium bis(fluorosulfonyl)imide as lithium salts based on the total amount of the non-aqueous liquid electrolyte.

Example 3

A non-aqueous liquid electrolyte and a lithium secondary battery were obtained by performing the same procedure described in Example 1 except for using 0.6 mol/L of $LiPF_6$ and 0.4 mol/L of lithium bis(fluorosulfonyl)imide as lithium salts based on the total amount of the non-aqueous liquid electrolyte.

Example 4

A non-aqueous liquid electrolyte and a lithium secondary battery were obtained by performing the same procedure described in Example I except for using 0.5 mol/L of $LiPF_6$ and 0.5 mol/L of lithium bis(fluorosulfonyl)imide as lithium salts based on the total amount of the non-aqueous liquid electrolyte.

Example 5

A non-aqueous liquid electrolyte and a lithium secondary battery were obtained by performing the same procedure described in Example 1 except for using di(1,1,1,2,2,3,3,4,4,5,5-undecafluoropentyl)ether, instead of di(1,1,1,2,2,3,3,4,4-nonafluoropentyl)ether.

Example 6

A non-aqueous liquid electrolyte and a lithium secondary battery were obtained by performing the same procedure described in Example I except for using $CF_3CH_2OCF_2CF_2H$ (AE3000, Asahi Glass Co., Ltd.), instead of di(1,1,1,2,2,3,3,4,4-nonafluoropentyl)ether.

Comparative Example 1

A non-aqueous liquid electrolyte and lithium secondary battery were obtained by performing the same procedure described in Example I except for using 0.4 mol/L of $LiPF_6$ and 0.6 mol/L of lithium bis(fluorosulfonyl)imide as lithium salts based on the total amount of the non-aqueous liquid electrolyte.

Comparative Example 2

A non-aqueous liquid electrolyte and a lithium secondary battery were obtained by performing the same procedure described in Example 2 except for not adding an additive.

Comparative Example 3

A non-aqueous liquid electrolyte and a lithium secondary battery were obtained performing the same procedure described in Example 2 except for using $Li(Ni_{0.5}Co_{0.3}Mn_{0.2})O_2$ as the positive electrode active material.

Experimental Examples

<Output Properties after Storing at High Temperature>
The secondary batteries manufactured in Examples 1 to 4 and Comparative Examples 1 to 3 were stored at 60° C. for 16 weeks, and the output thereof was calculated using voltage difference generated when charging and discharging at 23° C. with 5 C for 10 seconds. The output after 16 weeks was calculated by percent based on an initial output (output after 16 weeks (W)/initial output (W)*100(%)), and the results are illustrated in the following Table 1. The test was performed at the state of charge (SOC) of 50%.

<Capacity Properties after Storing at High Temperature>
The secondary batteries manufactured in Examples 1 to 4 and Comparative Examples 1 to 3 were charged in constant current/constant voltage (CC/CV) conditions to 4.2 V/38 mA with 1 C and discharged in CC conditions to 2.5 V with 3 C, and the discharge capacity thereof was measured. After that, the secondary batteries manufactured in Examples 1 to 4 and Comparative Examples 1 to 3 were stored at 60° C. for 16 weeks, charged in constant current/constant voltage (CC/CV) conditions at 23° C. to 4.2 V/38 mA with 1 C and discharged in CC conditions to 2.5 V with 3 C. The discharge capacity after weeks was calculated by percent based on an initial discharge capacity (discharge capacity after 16 weeks/initial discharge capacity*100(%)), and the results are illustrated in the following Table 1.

<Measuring of Thickness of Battery>

The secondary batteries manufactured in Examples 1 to 4 and Comparative Examples 1 to 3 were stored at 60° C. for 16 weeks, and thickness increasing rate (%) with respect to an initial thickness of the battery was measured. The results are illustrated in the following Table 1.

TABLE 1

| | Properties after scoring at high temperature | | |
|---|---|---|---|
| | Output properties (%) | Capacity properties (%) | Battery thickness increasing rate (%) |
| Example 1 | 95.4 | 89.9 | 5.3 |
| Example 2 | 96.7 | 92.8 | 4.1 |
| Example 3 | 96.8 | 91.4 | 4.9 |
| Example 4 | 96.0 | 90.9 | 5.2 |
| Example 5 | 96.3 | 91.6 | 4.3 |
| Example 6 | 93.9 | 90.8 | 6.8 |
| Comparative Example 1 | 95.2 | 88.7 | 6.1 |
| Comparative Example 2 | 92.4 | 84.1 | 19.7 |
| Comparative Example 3 | 88.6 | 80.5 | 9.8 |

As shown in Table 1, since the secondary batteries of Examples 1 to 4 use the fluorinated ether compound as an additive, the stability thereof at high temperature may increase, and the increasing rate of resistance thereof may decrease. Therefore, the properties after storing at high temperature (capacity and output properties) may be good via the combination with the lithium salt of the lithium bis(fluorosulfonyl)imide when compared to that of the secondary batteries of Comparative Examples 1 to 3.

Meanwhile, since the fluorinated ether compound was not used in Comparative Example 2, the thickness increasing rate after storing at high temperature was 19.7% and it means the battery has excessively swollen. In addition, the capacity properties and the output properties of the secondary battery of Example 6 were inferior to those of the secondary batteries of Example 1 to 5, although the fluorinated ether compound was used as an additive in the secondary battery of Example 6. The reason for the inferior capacity property and output property of the secondary battery of Example 6 considered as follows: The fluorinated ether compound included in the secondary battery of Example 6 has an alkyl group having 5 or less fluorine independently on both sides of oxygen atom, whereas the fluorinated ether compounds included in the secondary batteries of Example 1 to 5 have an alkyl group having 5 or more fluorine independently both sides of oxygen atom.

<Lifespan Properties at Room Temperature>

The secondary batteries manufactured in Examples 1 to and Comparative Examples 1 to 3 were charged in CC/CV conditions at 23° C. to 4.2 V/38 mA with C and discharged in CC conditions to 2.5 V with 3 C, and the discharge capacity thereof was measured. This experiment was repeatedly performed from $1^{st}$ to $800^{th}$ cycles. The discharge capacity at the $800^{th}$ cycle was calculated by percent based on the capacity at the 1° cycle (capacity at $800^{th}$ cycle/capacity at $1^{st}$ cycle*100(%)), and data thus obtained are illustrated in the following Table 2.

<Lifespan Properties at High Temperature>

The secondary batteries manufactured in Examples 1 to and Comparative Examples 1 to 3 were charged in CC/CV conditions at 45° C. to 4.2 V/38 mA with 1 C and discharged in CC conditions to 2.5 V with 3 C, and the discharge capacity thereof was measured. This experiment was repeatedly performed from $1^{st}$ to $800^{th}$ cycles. The discharge capacity measured at the $800^{th}$ cycle was calculated by percent based on the capacity at the $1^{st}$ cycle (capacity at $800^{th}$ cycle/capacity at $1^{st}$ cycle*100(%)), and data thus obtained are illustrated in the following Table 2.

TABLE 2

| | Lifespan properties (%) | |
|---|---|---|
| | Lifespan properties at room temperature | Lifespan properties at high temperature |
| Example 1 | 84.9 | 81.1 |
| Example 2 | 88.7 | 84.8 |
| Example 3 | 87.4 | 83.3 |
| Example 4 | 85.9 | 81.7 |
| Example 5 | 87.1 | 84.2 |
| Example 6 | 82.6 | 76.5 |
| Comparative Example 1 | 82.1 | 78.8 |
| Comparative Example 2 | 77.4 | 69.9 |
| Comparative Example 3 | 69.1 | 61.7 |

As shown in Table 2, it would be secured that the lifespan properties at room temperature and at high temperature of the lithium secondary batteries of Examples 1 to 4 are better than those of the lithium secondary batteries of Comparative Examples 1 to 3. The lifespan properties at high temperature and the lfespan properties at room temperature of the lithium secondary battery of Comparative Example 3 using $Li(Ni_{0.5}Co_{0.3}Mn_{0.2})O_2$ as the positive electrode active material are found markedly low.

Meanwhile, the lifespan properties at room temperature and at high temperature of the lithium secondary batteries of Examples 6 are inferior to those of the lithium secondary batteries of Examples 1 to 5, due to that the fluorinated ether compound included in the secondary battery of Example 6 has an alkyl group having 5 or less fluorine independently on both sides of oxygen atom.

The invention claimed is:

1. A lithium secondary battery comprising:
    a non-aqueous liquid electrolyte comprising lithium bis(fluorosulfonyl)imide (LiFSI) and a fluorinated ether compound as additives;
    a positive electrode comprising a lithium-nickel-manganese-cobalt-based oxide as a positive electrode active material;
    a negative electrode; and
    a separator,
    wherein the lithium-nickel-manganese-cobalt-based oxide is represented by the following Formula 1:

$Li_{1+x}(Ni_aCo_bMn_c)O_2$     [Formula 1]

in the above Formula, 0.6≤a≤0.65, 0.18≤b≤0.22, 0.18≤c≤0.22, −0.2≤x≤0.2 and x+a+b+c=1.

2. The lithium secondary battery of claim 1, wherein the non-aqueous liquid electrolyte further comprises a lithium salt.

3. The lithium secondary battery of claim 2, wherein a mixing ratio of the lithium salt and the lithium bis(fluorosulfonyl)imide by molar ratio is from 1:0.01 to 1:1.

4. The lithium secondary battery of claim 1, wherein a concentration of the lithium bis(fluorosulfonyl)imide in the non-aqueous liquid electrolyte is from 0.01 mol/L to 2 mol/L.

5. The lithium secondary battery of claim 2, wherein the lithium salt is one or a mixture of at least two selected from the group consisting of $LiPF_6$, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$ and $LiClO_4$.

6. The lithium secondary battery of claim 1, wherein the fluorinated ether compound is at least one selected from compounds represented by the following Formula 2:

[Formula 2]

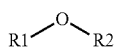

where $R_1$ and $R_2$ are independently a linear or branched alkyl group having 2 to 6 carbon atoms and at least 5 fluorine atoms.

7. The lithium secondary battery of claim 1, wherein the fluorinated ether compound is at least one selected from the group consisting of di(1,1,1,2,2,3,3,4,4-nonafluoropentyl) ether and di(1,1,1,2,2,3,3,4,4,5,5-undecafluoropentyl)ether.

8. The lithium secondary battery of claim 1, wherein an amount of the fluorinated ether compound is 1-20 wt % based on a total amount of the non-aqueous liquid electrolyte.

9. The lithium secondary battery of claim 1, wherein the non-aqueous liquid electrolyte further comprises a non-aqueous organic solvent selected from the group consisting of a nitrile-based solvent, a linear carbonate solvent, a cyclic carbonate solvent, an ester solvent, an ether solvent, a ketone solvent and a combination thereof.

10. The lithium secondary battery of claim 9, wherein the cyclic carbonate solvent is one or a mixture of at least two selected from ethylene carbonate (EC), propylene carbonate (PC) and butylene carbonate (BC), and the linear carbonate solvent is one or a mixture of at least two selected from the group consisting of dimethyl carbonate (DMC), diethyl carbonate (DEC), dipropyl carbonate (DPC), ethyl methyl carbonate (EMC), methyl propyl carbonate (MPC) and ethyl propyl carbonate (EPC).

11. The lithium secondary battery of claim 9, wherein the nitrile-based solvent is at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenyl acetonitrile and 4-fluorophenyl acetonitrile.

12. The lithium secondary battery according to claim 1, wherein the secondary battery is a pouch type lithium secondary battery.

* * * * *